April 20, 1926.
W. LARSEN
VEGETABLE BLANCHING MACHINE
Filed Nov. 15, 1921
1,581,933
3 Sheets-Sheet 2
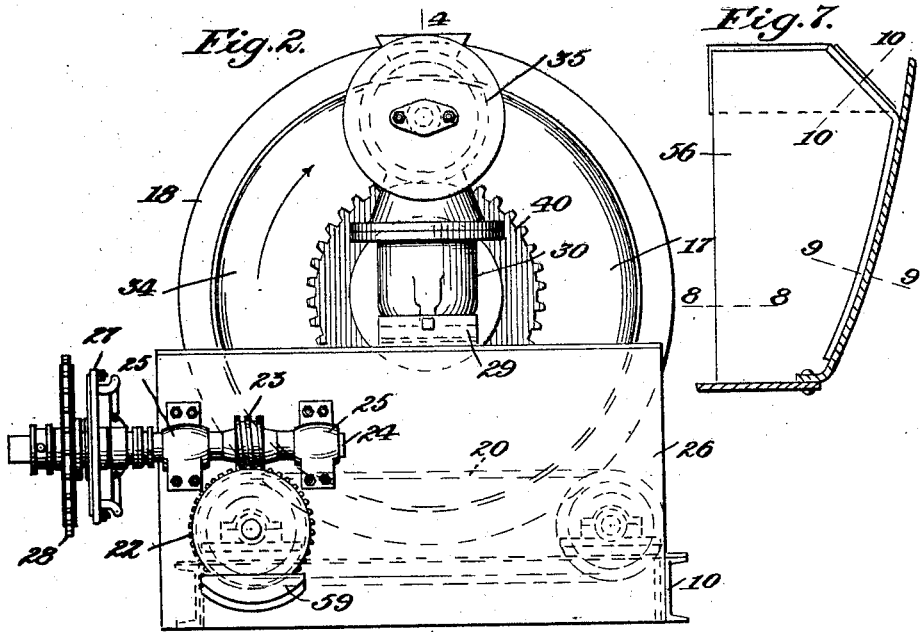
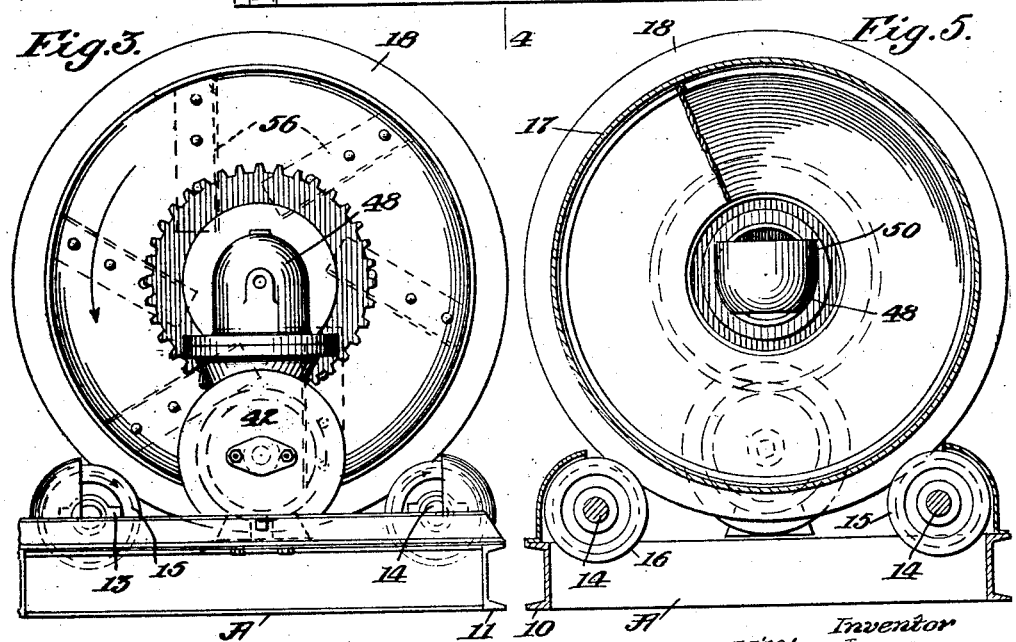
Inventor
William Larsen
Frank O. Parker
Atty.

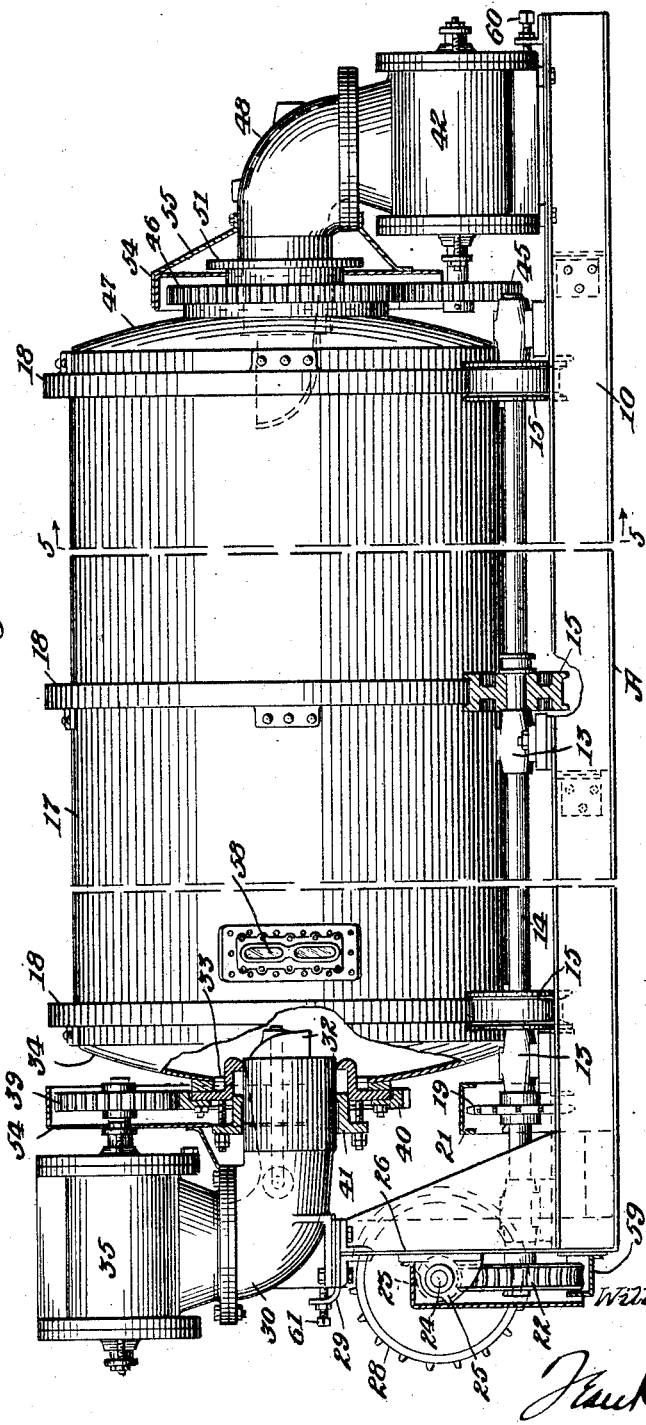

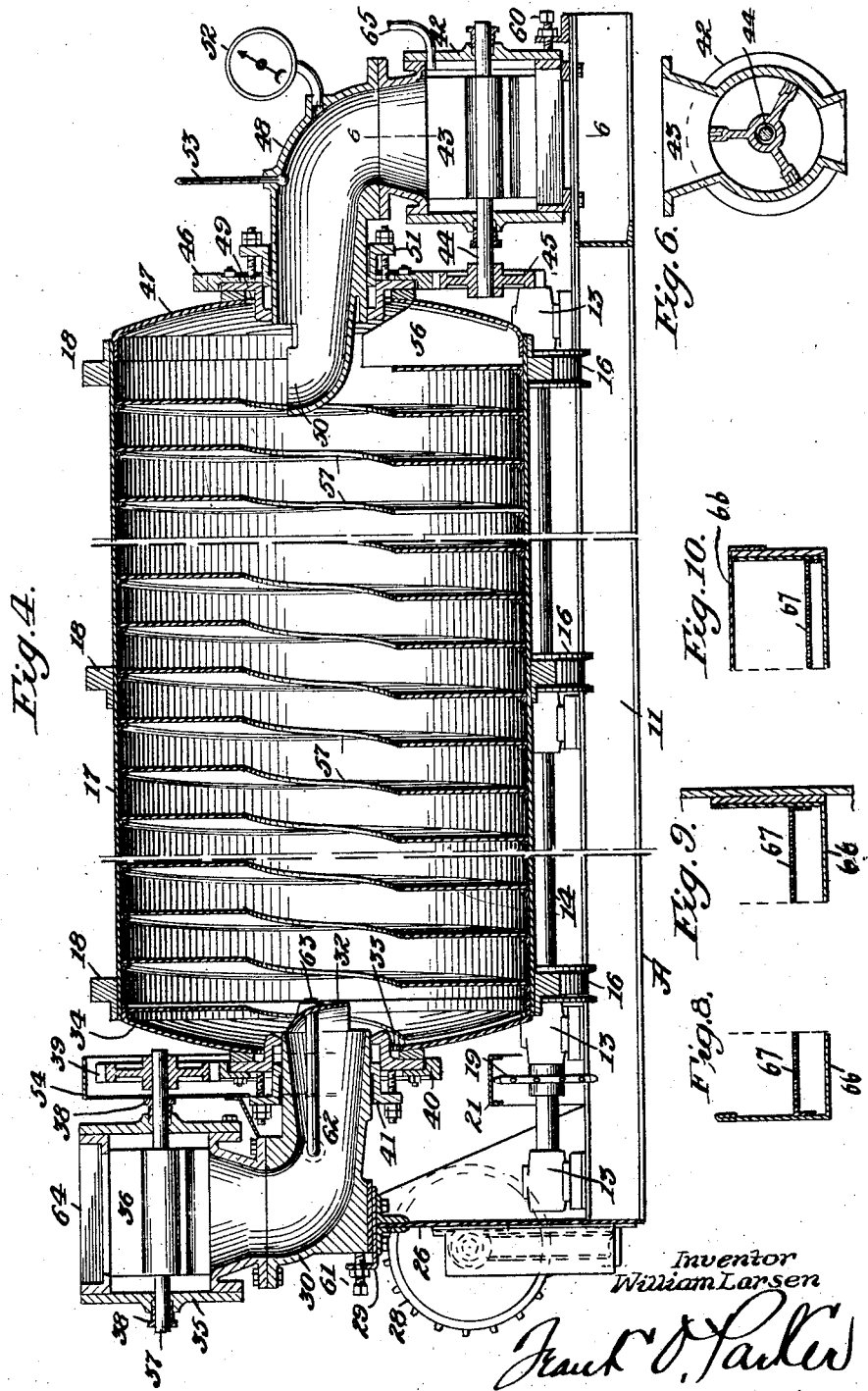

Patented Apr. 20, 1926.

1,581,933

UNITED STATES PATENT OFFICE.

WILLIAM LARSEN, OF GREEN BAY, WISCONSIN; AUSTIN C. LARSEN, MILTON W. LARSEN, AND JOSEPH H. TAYLER EXECUTORS OF SAID WILLIAM LARSEN, DECEASED.

VEGETABLE-BLANCHING MACHINE.

Application filed November 15, 1921. Serial No. 515,288.

*To all whom it may concern:*

Be it known that I, WILLIAM LARSEN, a citizen of the United States, residing at Green Bay, in the county of Brown and State of Wisconsin, have invented certain new and useful Improvements in Vegetable-Blanching Machines, of which the following is a specification.

The invention relates to a vegetable or food cooking apparatus, and more especially to the class of pea blanching machines.

The primary object of the invention is the provision of a machine of this character, wherein peas, beans, beets or other like vegetables are blanched or cooked without or with pressure approximately five pounds per square inch, without possibility of the exploding of the vegetables during the blanching process.

Another object of the invention is the provision of a machine of this character, wherein the vegetables during the cooking process are admitted into one end of a container with a determined amount of water, the container being fluid tight, and such vegetables are conveyed therethrough to the discharge end of the same, and delivered therefrom through the delivery port of said machine, with a quantity of water, so that in this manner the water will constantly circulate through the container, and the vegetables are cooked by the use of live steam with pressure or without pressure which enables the blanching process to be carried out expeditiously, and in contradistinction to the boiling process with superior results, and without possibility of overcooking or in any manner damaging the vegetables.

A further object of the invention is the provision of a machine of this character, wherein the construction thereof is novel in form, and has in use at the inlet and delivery ends Corliss valves to enable a continuous feed of the vegetables to and from the machine in its operation for the blanching process, the container being fluid-tight and likewise the casings for the Corliss valves enables live steam admitted to said container to be confined and in this manner the water within the container can be maintained at a determined temperature above the boiling point.

A still further object of the invention is the provision of a machine of this character, wherein the construction thereof enables the handling of large quantities of vegetables for the expeditious cooking of the same, the machine being simple in construction, thoroughly reliable and efficient in operation, and inexpensive in manufacture and installation.

With these and other objects in view, the invention consists in the features of construction, combination and arrangements of parts, as will be hereinafter more fully described, illustrated in the accompanying drawings, and pointed out in the claims hereunto appended.

In the accompanying drawings:

Figure 1, is a side elevation of a machine constructed in accordance with the invention, the container or drum being partly broken away at intervals thereof, to show certain detail features of construction.

Figure 2, is one end elevation.

Figure 3, is the other end elevation.

Figure 4, is a longitudinal sectional elevation through the machine.

Figure 5, is a sectional view on the line 5—5 of Figure 1, looking in the direction of the arrow.

Figure 6, is a fragmentary vertical transverse sectional view of the hopper and inlet valve.

Figure 7, is a fragmentary detail sectional view through one of the buckets.

Figure 8, is a sectional view on the line 8—8 of Figure 7.

Figure 9, is a sectional view on the line 9—9 of Figure 7.

Figure 10, is a sectional view on the line 10—10 of Figure 7.

Similar reference characters indicate corresponding parts throughout the several views in the drawings:

Referring to the drawings in detail, the machine comprises a base frame A, including longitudinal and transverse sills or beams 10, and 11, respectively, the same being united to each other in any suitable manner. Mounted upon suitable supports in the form of blocks 12, arranged at intervals lengthwise of the base frame A, on opposite sides thereof, are bearings 13, in which are journaled driven shafts 14, having keyed or splined thereto intermediate and outer peripherally grooved rollers 15, and 16, respectively, for movably supporting a container in the form of a cylindrical drum 17, provided with external bands or flanges 18, to be received in the grooves in said rollers, to prevent longitudinal displacement of the drum when being rotated. The bands or flanges 18 are bolted or otherwise secured in place upon the drum 17.

Secured to the shafts 14, are sprocket wheels 19, over which is trained an endless sprocket chain 20, so that motion from one shaft will be imparted to the other, and these shafts will rotate in the same direction in unison, the sprocket wheels 19, being preferably located at the fore end of the machine.

The sprocket wheels and chain have over the same a guard 21, which is of an approved form. On one of the shafts 14, at the fore end of the machine is a worm gear 22, which meshes with a worm screw pinion 23, on a stub shaft 24, mounted in bearings 25 fixed to a riser 26, upon the base frame A.

The shaft 24, carries a clutch 27, which is adapted to be manually operated and is designed to control a drive pulley or sprocket gear 28, which is loosely mounted upon said shaft 24, and is made fast thereto by the clutch when actuated, the motive power for the machine being connected with the sprocket gear 28, and may be of any conventional type.

Medially of the riser 26, is a chair 29, upon which is adjustably mounted an inlet casting or nozzle 30, through which is admitted the vegetables to be cooked, into the drum 17, the mouth 31, of the casting or nozzle 30, being fitted with a downwardly directed baffle 32, the nozzle or casting and baffle being extended through a center opening 33, formed in the forward head 34, of the drum 17, while carried at the other end of the inlet casting 30, is a cylindrical valve casing 35, having therein a multiple bladed rotary valve 36, of the Corliss type, the stem 37, thereof being journaled in the ends of the valve casing 35, and these ends are provided with packing glands 38, about the stem.

On one end of the stem 37, is a gear 39, meshing with a companion gear 40, secured to the head 34, of the drum 17, while about the center opening 33, in said head is a steam and water tight gland 41, which surrounds the casting or nozzle 30, to prevent any leakage between it and the head during the rotation of the drum, when the machine is operating.

At the discharge end of the drum 17, is arranged a discharge valve casing 42, having therein a multiple bladed rotary valve 43, of the Corliss type, corresponding to the valve 36, the stem 44, of said valve 43, being journaled in the ends of the casing 42, and carries at one end a gear 45, meshing with a companion gear 46, fitted on the head 47, at the discharge end of the drum 17, the valve casing 42, being connected with a discharge nozzle 48, extending into the drum 17, through a center opening 49, in the head 47, the mouth 50, of the nozzle 48, being designed to open upwardly in the drum for receiving the vegetables therein. About the opening 49, is a steam and water tight gland 51, corresponding to the other gland 41, heretofore mentioned.

The nozzle 48, is provided with a pressure gauge 52, and a temperature controlling device 53, of any conventional type. The gears 39—40, and 45—46, are encased with a guard 54 and 55, respectively, which are supported in any suitable manner.

On the inner face of the head 47, are riveted or otherwise secured thereto buckets 56, which are arranged tangentially relative to the center opening 49, in said head, so as to trap the vegetables and a portion of the water contained in the drum 17, and deliver the same through the center opening 49, where a discharge will be effected through the discharge nozzle 48, into the valve casing 42, and thence therefrom exteriorly of the machine.

Within the drum 17, is a spiral 57, forming a conveyer for the vegetables within the said drum, this spiral being secured to the cylindrical wall of the latter and to the head 34 at one end, while the other end of the spiral is designed to terminate between one or more pair of the buckets 56, one of the latter being flanged for the riveting or otherwise securing of the spiral thereto.

On the drum 17, is mounted a water glass 58, of any ordinary construction, so that it may be determined the level of the water in said drum.

The worm gear 22, works in an oil pan 59, mounted upon the base frame A, so that it can be properly lubricated in the operation of the machine.

The valve casing 42, is adjustably mounted upon the base frame A, and is held in place by a set screw 60, and likewise the inlet casting 30, is held in place by a set screw 61, engaged in the chair 29, on the riser 26, upon the base frame.

Extending through the inlet nozzle 30, is a steam pipe 62, having an ejector 63, so as to cause a suction in the drum 17, to maintain a constant level of water in the latter, while the steam admitted through the pipe into the said drum 17, will effect the lbs. pressure per inch therein. The steam is conveyed to the pipe 62, from any suitable source.

On the upper portion of the valve casing 35, is a hopper 64, into which is introduced the peas or other vegetables and water. The spiral 57 in the drum 17, forms a continuous passageway and operates at the bottom of said drum to forward vegetables and water along said bottom as the vegetables are fed into the drum from the inlet nozzle 30, at the feed end of the machine.

In general it is preferable to employ water, which will be fed into the drum 17, at a rate proportional to the feed of vegetables into the drum and the rate of rotation thereof and the discharge of vegetables and water from said drum.

It will be understood that the drum 17, is caused to rotate quite slowly so that without excessive length the vegetables may be caused to travel at the bottom of the said drum at a rate sufficiently so that the time which elapses from the entrance of said vegetables into the water to their discharge from the buckets will be long enough to effect the desired cooking and no longer. The admission of the water and the discharge thereof to and from the drum 17, is regulated so as to maintain a constant determined level of water over the bottom of said drum for the vegetables to pass therethrough in the cooking.

In Figures 7, 8, 9 and 10, of the drawings, there are shown certain details of construction of the specific form of each bucket 56 connected at the end 47, of the drum 17 of the apparatus. Each bucket 56, is formed with a water pan 66 and a screen 67 therein.

Leading through the end cap of the outlet valve 42, is a nozzle 65, through which cool water is admitted into the discharge end of the apparatus, so as to cool the contents at its delivery end. The drum 17, which as heretofore stated is fluid-tight, and likewise the inlet nozzle 30, outlet nozzle 48, and valve casings 35, and 42, respectively, will enable the live steam under pressure, or when not under pressure, admitted to said drum to be confined therein, so that the water within the latter can be heated for maintaining it at a determined temperature above the boiling point.

What is claimed is:

1. An apparatus of the character described, comprising a base frame, spaced parallel driven shafts journaled lengthwise of the frame, peripherally grooved rollers fixed on the shafts, a cylindrical container closed at its ends supported by the rollers and having external annular bands received by the grooved rollers, an inlet nozzle extending centrally through one end of the container, an outlet nozzle extending centrally through the other end of the container, valve casings connected with the nozzles, rotatable Corliss valves within the casings, gear connections between the valves and container for operating the said valves, means for delivering live steam into the container, a spiral conveyor within the container, and buckets at the discharge end of the container.

2. An apparatus of the character described, comprising a base frame, spaced parallel driven shafts journaled lengthwise of the frame, peripherally grooved rollers fixed on the shafts, a cylindrical container closed at its ends supported by the grooved rollers and having external annular bands received by the grooved rollers, an inlet nozzle extending centrally through one end of the container, an outlet nozzle extending centrally through the other end of the container, valve casings connected with the nozzles, rotatable Corliss valves within the casings, gear connections between the valves and container for operating said valves, means for delivering live steam into the container, a spiral conveyor within the container, buckets at the discharge end of the container, means rendering the valves and nozzles fluid-tight, and means for driving said shafts.

3. An apparatus of the character described, comprising a rotatable cylindrical container closed at its ends, inlet and outlet nozzles extending through the ends of the container, valved casings connected with said nozzles for admitting and discharging water and vegetables to and from the container, means for introducing live steam into the container, means interiorly of the container for feeding the vegetables from one end to the other, buckets at the discharge end of the container for delivering vegetables and water to the outlet nozzle, and connections between the container and the valves in the valve casings to operate said valves on rotation of the container.

In testimony whereof I have affixed my hand.

WILLIAM LARSEN.